United States Patent
Burtea et al.

(10) Patent No.: US 10,768,146 B1
(45) Date of Patent: Sep. 8, 2020

(54) PREDICTING SEVERITY OF BUILDUP WITHIN PIPES USING EVALUATION OF RESIDUAL ATTENUATION

(71) Applicant: Mueller International, LLC, Atlanta, GA (US)

(72) Inventors: Valentin Mircea Burtea, Toronto (CA); Sebastien Perrier, Toronto (CA); Bruce Robertson, Toronto (CA)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/659,333

(22) Filed: Oct. 21, 2019

(51) Int. Cl.
*G01N 29/44* (2006.01)
*G01N 29/11* (2006.01)

(52) U.S. Cl.
CPC ......... *G01N 29/11* (2013.01); *G01N 29/4418* (2013.01); *G01N 2291/0256* (2013.01)

(58) Field of Classification Search
CPC ............... G01N 29/11; G01N 29/4418; G01N 2291/0256
USPC .......................................................... 73/592
See application file for complete search history.

(56) References Cited

U.S. PATENT DOCUMENTS

| | | |
|---|---|---|
| 4,289,019 A | 9/1981 | Claytor |
| 5,416,724 A | 5/1995 | Savic |
| 5,531,099 A | 7/1996 | Russo |
| 6,435,030 B1 | 8/2002 | Gysling et al. |
| 6,453,247 B1 | 9/2002 | Hunaidi |
| 7,007,545 B1 | 3/2006 | Martinek |
| 7,059,176 B2 * | 6/2006 | Sparks ................. G01F 1/8404 73/54.01 |
| 7,203,322 B1 | 4/2007 | Bostock |
| 7,266,992 B2 | 9/2007 | Shamout et al. |
| 7,328,618 B2 | 2/2008 | Hunaidi et al. |
| 7,624,650 B2 * | 12/2009 | Gysling ................. G01F 1/662 73/861.27 |

(Continued)

FOREIGN PATENT DOCUMENTS

| | | |
|---|---|---|
| CN | 106289121 | 1/2017 |
| EP | 3392636 | 10/2018 |
| WO | 2014050618 | 4/2014 |

OTHER PUBLICATIONS

Yusuf, Shabbir; Issue Notification for U.S. Appl. No. 14/740,902, filed Jun. 16, 2015, dated Nov. 15, 2017, 1 pg.

(Continued)

*Primary Examiner* — Jacques M Saint Surin
(74) *Attorney, Agent, or Firm* — Taylor English Duma LLP (57) ABSTRACT

Methods, systems, and computer-readable storage media for predicting the amount of buildup in a pipe of a fluid distribution system by evaluating a loss of acoustic energy from a sound source over a distance of the pipe. An acoustic energy in an acoustical wave travelling in the fluid of a pipe is measured at a first location and a second location, and an estimated damping factor for the segment of pipe between the first and second locations is computed based on a comparison of the acoustic energy measured at the first location and the second location. A residual attenuation for the segment of the pipe is determined from a difference between the estimated damping factor and a theoretical damping factor for the pipe based on a material comprising a pipe wall, and an amount of buildup in the pipe is estimated based on the residual attenuation.

20 Claims, 4 Drawing Sheets

(56) References Cited

U.S. PATENT DOCUMENTS

| | | | |
|---|---|---|---|
| 7,752,918 B2* | 7/2010 | Davis | G01F 1/667 |
| | | | 73/861.28 |
| 7,810,378 B2 | 10/2010 | Hunaidi et al. | |
| 7,830,273 B2 | 11/2010 | Twitchell, Jr. | |
| 7,962,293 B2* | 6/2011 | Gysling | G01F 1/34 |
| | | | 340/606 |
| 8,296,083 B2 | 10/2012 | Martin | |
| 8,601,875 B2 | 12/2013 | Paulson | |
| 8,695,418 B2* | 4/2014 | Sparks | G01F 1/78 |
| | | | 73/204.26 |
| 8,816,866 B2 | 8/2014 | Day | |
| 8,966,979 B2 | 3/2015 | Amundsen | |
| 9,053,519 B2 | 6/2015 | Scolnicov et al. | |
| 9,541,432 B2 | 1/2017 | Kertesz | |
| 9,816,848 B2* | 11/2017 | Raykhman | G01N 29/4472 |
| 9,835,592 B2 | 12/2017 | Yusuf et al. | |
| 10,209,225 B2 | 2/2019 | Perrier | |
| 10,509,012 B2 | 12/2019 | Perrier | |
| 10,565,752 B2 | 2/2020 | Perrier et al. | |
| 10,690,630 B2 | 6/2020 | Perrier et al. | |
| 2005/0000289 A1 | 1/2005 | Gysling et al. | |
| 2006/0283251 A1 | 12/2006 | Hunaidi | |
| 2007/0041333 A1 | 2/2007 | Twitchell | |
| 2008/0078247 A1 | 4/2008 | Hunaidi et al. | |
| 2008/0314122 A1 | 12/2008 | Hunaidi | |
| 2009/0250125 A1 | 10/2009 | Howitt | |
| 2011/0161037 A1 | 6/2011 | Sutherland | |
| 2012/0041694 A1 | 2/2012 | Stephens et al. | |
| 2012/0055262 A1 | 3/2012 | Sinha | |
| 2013/0211797 A1 | 8/2013 | Scolnicov | |
| 2013/0213482 A1 | 8/2013 | Schuberth | |
| 2015/0300907 A1 | 10/2015 | Giunta et al. | |
| 2016/0041286 A1 | 2/2016 | Sinha et al. | |
| 2016/0208952 A1 | 7/2016 | Howitt | |
| 2016/0223120 A1 | 8/2016 | Gagliardo | |
| 2016/0252422 A1 | 9/2016 | Howitt | |
| 2016/0290974 A1 | 10/2016 | Coleman | |
| 2016/0370325 A1 | 12/2016 | Yusuf | |
| 2018/0306753 A1 | 10/2018 | Perrier | |
| 2018/0306755 A1 | 10/2018 | Perrier et al. | |
| 2018/0308265 A1 | 10/2018 | Perrier et al. | |
| 2019/0128766 A1 | 5/2019 | Burtea et al. | |
| 2019/0128767 A1 | 5/2019 | Burtea | |
| 2019/0128848 A1 | 5/2019 | Perrier | |

OTHER PUBLICATIONS

Yusuf, Shabbir; Non-Final Office Action for U.S. Appl. No. 14/740,902, filed Jun. 16, 2015, dated Jan. 27, 2017, 22 pgs.

Yusuf, Shabbir; Notice of Allowance for U.S. Appl. No. 14/740,902, filed Jun. 16, 2015, dated Aug. 30, 2017, 5 pgs.

Yusuf, Shabbir; Supplemental Notice of Allowability for U.S. Appl. No. 14/740,902, filed Jun. 16, 2015, dated Sep. 15, 2017, 4 pgs.

Perrier, Sebastien; Issue Notification for U.S. Appl. No. 15/493,899, filed Apr. 21, 2017, dated Jan. 30, 2019, 1 pg.

Perrier, Sebastien; Notice of Allowance for U.S. Appl. No. 15/493,899, filed Apr. 21, 2017, dated Sep. 24, 2018, 13 pgs.

Perrier, Sebastien; Supplemental Notice of Allowance for U.S. Appl. No. 15/493,899, filed Apr. 21, 2017, dated Nov. 9, 2018, 6 pgs.

Perrier, Sebastien; Non-Final Office Action for U.S. Appl. No. 16/232,268, filed Dec. 26, 2018, dated Jun. 13, 2019, 15 pgs.

Perrier, Sebastien; Notice of Allowance for U.S. Appl. No. 16/232,268, filed Dec. 26, 2018, dated Sep. 6, 2019, 9 pgs.

Perrier, Sebastien; Supplemental Notice of Allowance for U.S. Appl. No. 16/232,268, filed Dec. 26, 2018, dated Nov. 22, 2019, 6 pgs.

Leinov et al, "Investigation of guided wave propagation and attenuation in pipe buried in sand", J of Sound and Vibration 347 (2015) 96-114, 19 pgs.

Long et al., "The effect of soil properties on acoustic wave propagation in buried iron water pipes", AIP Conference Proceedings 615, 1310 (2002), 9 pgs.

Perrier, Sebastien; Ex Parte Quayle Action for U.S. Appl. No. 15/493,914, filed Apr. 21, 2017, dated Jun. 13, 2019, 15 pgs.

Perrier, Sebastien; Non-Final Office Action for U.S. Appl. No. 15/493,914, filed Apr. 21, 2017, dated Dec. 14, 2018, 19 pgs.

Perrier, Sebastien; Notice of Allowance for U.S. Appl. No. 15/493,914, filed Apr. 21, 2017, dated Nov. 20, 2019, 19 pgs.

Perrier, Sebastien; Non-Final Office Action for U.S. Appl. No. 15/493,906, filed Apr. 21, 2017, dated Jul. 5, 2019, 22 pgs.

Perrier, Sebastien; Notice of Allowance for U.S. Appl. No. 15/493,906, filed Apr. 21, 2017, dated Oct. 2, 2019, 11 pgs.

Perrier, Office Action for European for serial No. 18166849.2, filed Apr. 11, 2018, dated Sep. 19, 2019, 5 pgs.

Perrier, Sebastien; Extended European Search Report for serial No. 18166849.2, filed Apr. 11, 2018, dated Jul. 19, 2018, 7 pgs.

Almeida, et al.; Article entitled: "On the Acoustic Filtering of the Pipe and Sensor in a Buried Plastic Water Pipe and its Effect on Leak Detection: An Experimental Investigation", Sensors, Copyright 2014, 16 pgs.

De Almeida, et al.; Article entitled: "Measurement of Wave Attenuation in Buried Plastic Water Distribution Pipes", Journal of Mechanical Engineering, published on Apr. 1, 2014, 9 pgs.

Oelze, et al.; Article entitled: "Measurement of Attenuation and Speed of Sound in Soils", Soil Sci. Soc. Am. J., vol. 66, May-Jun. 2002, 9 pgs.

Perrier, Sebastien; Corrected Notice of Allowance for U.S. Appl. No. 15/493,914, filed Apr. 21, 2017, dated Feb. 20, 2020, 6 pgs.

Perrier, Sebastien; Corrected Notice of Allowance for U.S. Appl. No. 15/493,914, filed Apr. 21, 2017, dated Mar. 6, 2020, 6 pgs.

Perrier, Office Action for European for serial No. 18166849.2, filed Apr. 11, 2018, dated Feb. 3, 2020, 6 pgs.

Perrier, Sebastien; Corrected Notice of Allowance for U.S. Appl. No. 15/493,914, filed Apr. 21, 2017, dated May 22, 2020, 10 pgs.

* cited by examiner

PREDICTING SEVERITY OF BUILDUP WITHIN PIPES USING EVALUATION OF RESIDUAL ATTENUATION

BRIEF SUMMARY

The present disclosure relates to technologies for predicting the amount of buildup in a pipe of a fluid distribution system by evaluating a loss of acoustic energy from a sound source over a distance of the pipe. According to some embodiments, a method comprises measuring an acoustic energy in an acoustical wave travelling in the fluid in a pipe at first location and a second location and computing an estimated damping factor for the segment of pipe between the first and second locations based on a comparison of the acoustic energy measured at the first location and the second location. A residual attenuation for the segment of the pipe is determined from the difference between the estimated damping factor and a theoretical damping factor for the pipe based on the material comprising a pipe wall, and an amount of buildup in the pipe is estimated based on the residual attenuation.

According to further embodiments, a computer-readable medium comprises processor-executable instructions that cause a computer system to receive a first signal from a first acoustic sensor representing the sound pressure of an acoustical wave travelling in a fluid in a pipe sensed at a first location along the pipe and a second signal from a second acoustic sensor representing the sound pressure of the acoustical wave sensed at a second location along the pipe. An estimated damping factor for the pipe segment between the first and second locations is computed based on a comparison of the sound pressures sensed at the first location and the second location along the pipe from the first and second signals. A residual attenuation for the segment is determined from the difference between the estimated damping factor and a theoretical damping factor for the pipe based on the material comprising a pipe wall, and the amount of buildup in the pipe is estimated based on the residual attenuation.

According to further embodiments, a water distribution system comprises an acoustical wave generator, a first acoustic sensor, a second acoustic sensor, and an acoustic analysis module. The acoustical wave generator is in acoustical communication with a pipe in the water distribution system and is configured to generate an acoustical wave in a fluid path of the pipe. The first and second acoustic sensors are in acoustical communication with the pipe at a first and second location, respectively, and configured to produce a signal representing the sensed sound pressure at that location. The acoustic analysis module executes on a pipe assessment system and is configured to receive the first signal and the second signal and compute an estimated damping factor for the pipe segment between the first and second location based on a comparison of the sound pressure measured at the first location and the second location from the first and second signals. A residual attenuation for the pipe segment is determined from a difference between the estimated damping factor and a theoretical damping factor for the pipe based on the material comprising the pipe wall, and an amount of buildup in the pipe is estimated based on the residual attenuation.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for predicting the amount of buildup in a pipe of a fluid distribution system by evaluating a loss of acoustic energy from a sound source over a distance of the pipe. Water distribution mains degrade primarily in two ways. First, pipe walls become thinner and weaker. Second, buildups can accumulate inside the mains resulting in reduced pressure in the water distribution system and increasing the potential for leaks. This can cause hydraulic failure of the distribution system by restricting flow. It can also increase energy costs, as well as lower water pressures and leave insufficient flow for firefighting should the need arise. However, there is currently no non-disruptive method of measuring buildup in water mains and other pipes in a water distribution system.

As described herein, a system may be implemented that predicts the level of buildup in water mains and other pipes of a water or other fluid distribution system in a non-disruptive manner. This system relies on the loss of acoustical energy (also known as attenuation) due to the buildups within pipes. Signals are acquired from at least two positions at different locations along a pipe in which a level of buildup is to be measured. For example, two sensors located about 100 m apart along the pipe each measure the acoustical signals from an out-of-bracket sound source. The signals are sent to a central analysis computer and processed to determine the spectrum for each signal, which provides the acoustic power density at the two locations. The acoustic densities at the two locations are compared to determine the attenuation for the segment of pipe bracketed by the sensors. The measured attenuation is compared to the attenuation predicted by a model to determine the residual attenuation. This residual attenuation determines whether the presence and severity of buildup on the inside of the pipe between the sensors. Using the non-disruptive system described herein, water utilities and other operators of fluid systems may gain a better understanding of their water networks, empowering them to better manage precious water sources and infrastructure.

Figure 1:
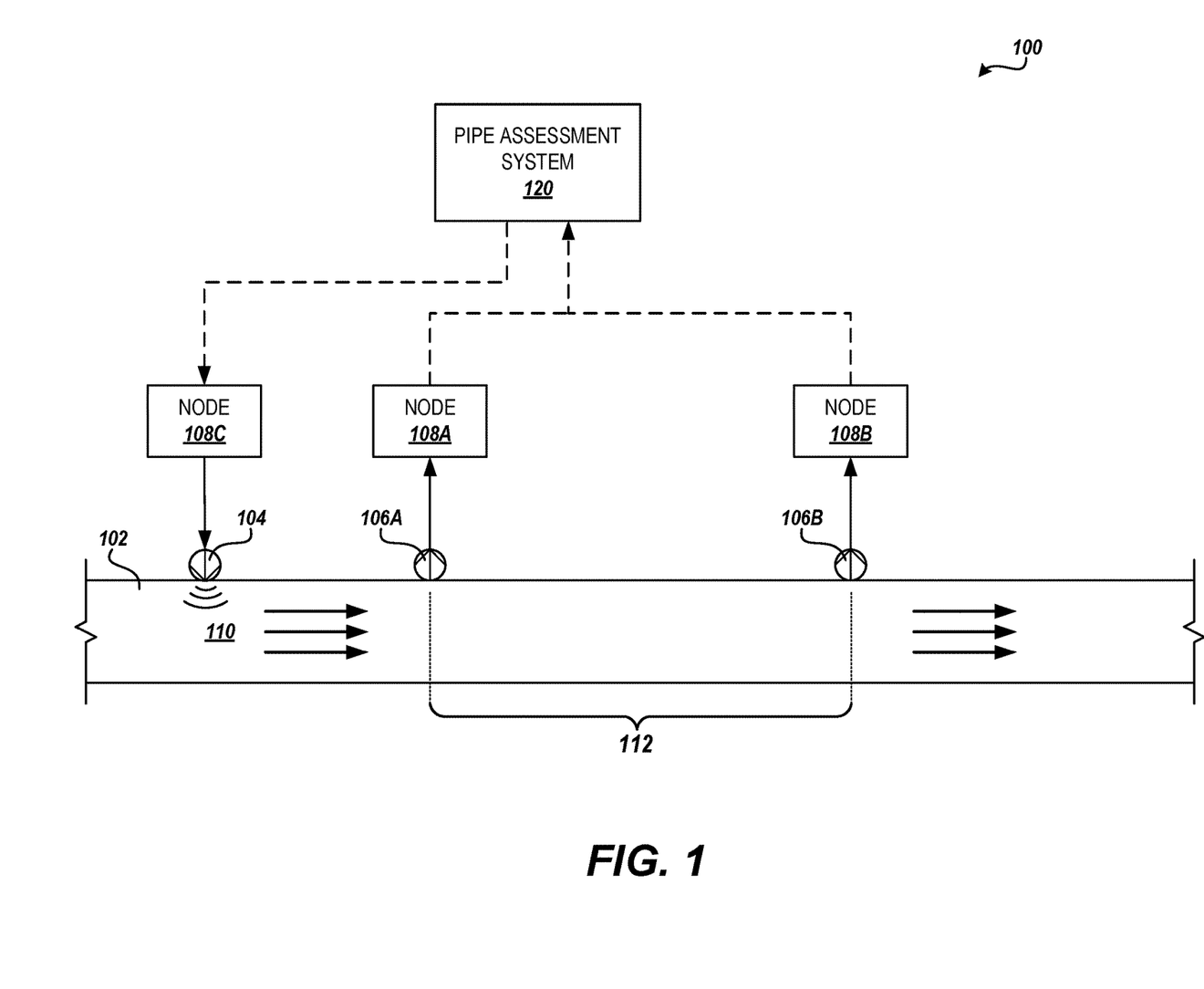
FIG. 1 is a block diagram showing one illustrative environment for the implementation of the embodiments described herein for predicting the severity of buildup within a pipe using evaluation of acoustic attenuation, according to embodiments presented herein.

FIG. 1 and the following description are intended to provide a general description of a suitable environment in which the embodiments described herein may be implemented. In particular, FIG. 1 shows an environment 100 for predicting the amount of buildup in a pipe of a fluid distribution system by evaluating a loss of acoustic energy from a sound source over a distance of the pipe, according to embodiments described herein. The environment 100 includes a pipe 102 within which buildup is to be measured. According to some embodiments, the pipe 102 may be a main in a water or other fluid distribution system that may include many pipes of various diameters and made of various materials, all connected in a fluid network. The fluid distribution system may further include other distribution system components, such as couplings, valves, hydrants, pumps, and the like, all connected together to form the fluid network, of which the pipe 102 is a part.

In some embodiments, the fluid network may be partially or wholly subterranean, or portions of the fluid network may be subterranean, while other portions of the fluid network may be non-subterranean (i.e., above ground). For example, the pipe 102 may be partially or wholly subterraneous while a hydrant or valve (not shown) connected to the pipe may be located above ground. In other embodiments, the pipe 102 may be partially subterranean in that the pipe has portions exposed, such as to allow easy connection of sensor or testing devices (e.g., acoustical wave generators and acoustic sensors described herein) to the pipe.

The environment 100 further includes an acoustical wave generator 104 and two or more acoustic sensors, such as acoustic sensors 106A and 106B (referred to herein generally as acoustic sensors 106), inserted into a fluid path 110 of the pipe 102, attached to an outside of the pipe wall, or otherwise in acoustical communication with the pipe. For purposes of this disclosure, a component or device being "in acoustical communication with" the pipe 102 represents the component being connected directly or indirectly to the pipe in such a way that an acoustical wave or acoustic signal traveling through a fluid in the pipe can be produced or sensed by the component.

According to embodiments, the acoustical wave generator 104 generates an acoustical wave, i.e., a sound wave or longitudinal pressure wave, within a fluid path 110 of the pipe 102. The acoustical wave generator 104 may comprise any device suitable for the creation of sound or vibration in the pipe 102 to produce the acoustical wave, including electro-mechanical device, such as a speaker or hydrophone, a mechanical device, such as a hammer or piston for striking the pipe wall, and the like. In further embodiments, a valve may be opened and closed one or more times so as to generate an acoustical wave within the fluid flowing through the pipe 102. It will be understood that any other techniques may be implemented to cause the acoustical wave to be generated in the fluid path 110. The acoustical wave generator 104 may be attached to an outer wall of the pipe 102 or to another component in fluid communication with the pipe, such as a hydrant or valve. In other embodiments, the acoustical wave generator 104 may extend partially or wholly into the fluid path 110, or may be located in proximity to the external surface of the pipe 102 and transmit acoustic energy through the soil surrounding the pipe.

The acoustic sensors 106 measure the sound pressure of the acoustic wave propagating through the pipe 102. In some embodiments, the acoustic sensors 106 may comprise hydrophones inserted into the fluid path 110. In other embodiments, the acoustic sensors may comprise transducers or accelerometers attached to the outer wall of the pipe 102 or to another component in fluid communication with the pipe, such as a hydrant. The transducers or accelerometers may measure the instantaneous acceleration of the pipe wall from vibrations caused by the sound pressure of the acoustic wave. The measured acceleration of the wall constitutes an indirect measurement of sound pressure in the pipe. In further embodiments, the acoustic sensors 106 may include hydrophones, transducers, accelerometers, or any combination of these and other sensors known in the art for measuring acoustic signals. In some embodiments, two acoustic sensors 106A and 106B are placed in acoustical communication with the pipe at a specific distance apart, bracketing a specific pipe segment 112, as shown in FIG. 1. The length of the pipe segment 112 may be hundreds of centimeters, hundreds of meters, or even several kilometers apart. In some embodiments, the acoustic sensors 106A and 106B may be connected to the same pipe, such as pipe 102, as further shown in FIG. 1. In further embodiments, the acoustic sensors 106A and 106B be placed on separate pipes or portions of the fluid network.

According to some embodiments, the acoustical wave generator 104 is located outside of the segment of pipe between the two acoustic sensors 106A and 106B, referred to herein as being located "out-of-bracket." The acoustic sensors 106A and 106B sense the sound pressure in the pipe 102 generated by the acoustical wave generator 104 at their respective locations. The acoustic sensors 106A and 106B produce a signal representing the sensed sound pressures, which is monitored by an electronic device, referred to herein as a "node," such as nodes 108A and 108B, respectively (referred to herein generally as nodes 108). In further embodiments, the acoustical wave generator 104 may also be controlled by a node 108C, as shown.

In some embodiments, the nodes 108 are further connected to a pipe assessment system 120. The nodes 108A and 108B may send the signals representing the sensed sound pressures at the respective acoustic sensors 106A and 106B to the pipe assessment system 120. The pipe assessment system 120 may then analyze the signals to determine an amount of buildup in the segment 112 of the pipe 102 bracketed by the acoustic sensors 106A and 106B utilizing the methods and technologies described herein. It will be appreciated that the amount of buildup in the bracketed segment 112 may be representative of the severity of buildup in the pipe 102 or pipe network as a whole.

Figure 2:
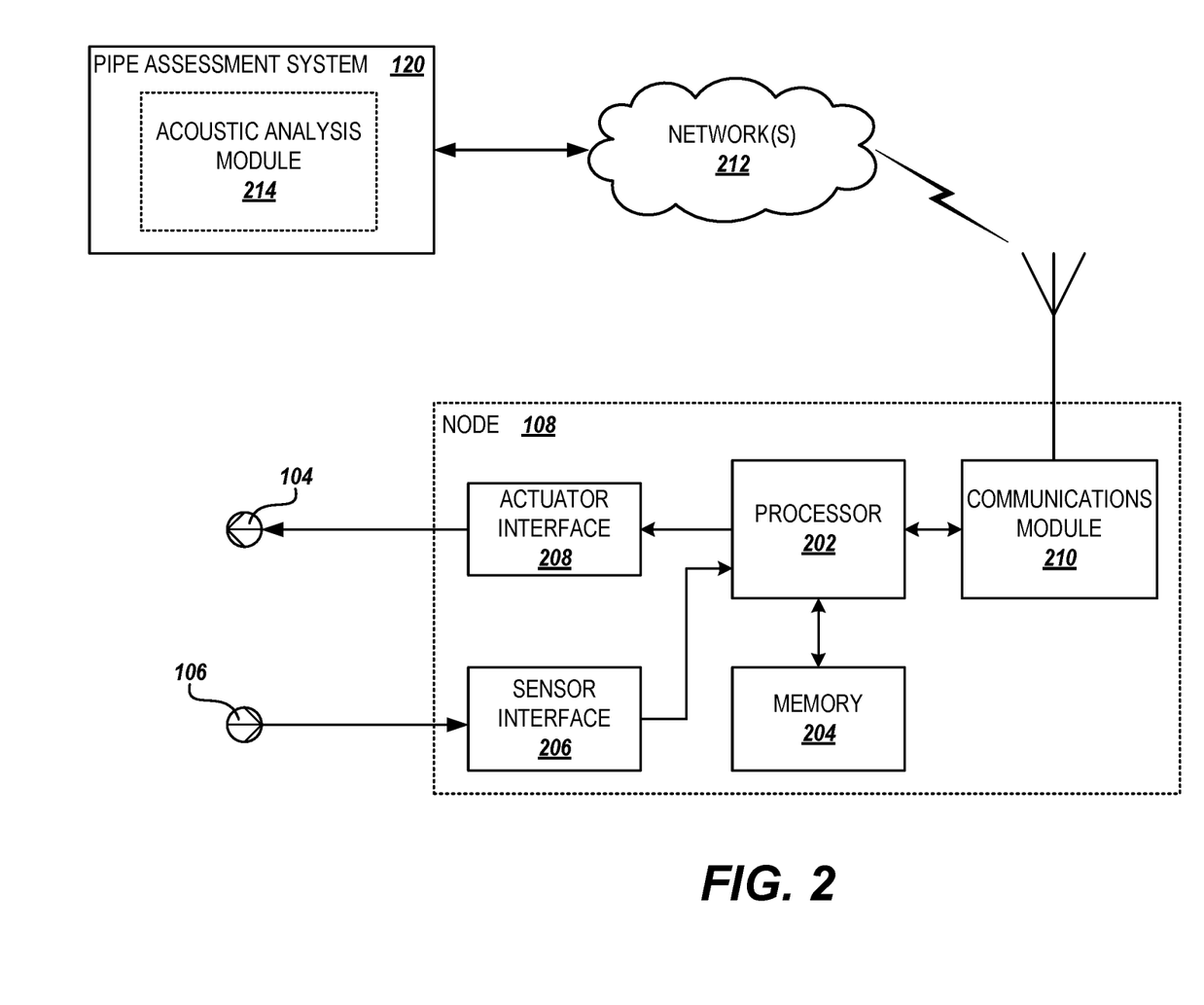
FIG. 2 is a block diagram showing additional details of a node in the illustrative environment shown in FIG. 1, according to some embodiments.

FIG. 2 shows additional details of illustrative computing components for one implementation of the environment 100 described above, according to some embodiments. Each node 108 includes a processor 202. The processor 202 may comprise a microcontroller or other processing resource capable executing instructions and routines stored in a connected memory 204. The memory 204 may comprise a computer-readable storage medium for storing processor-executable instructions, data structures and other information. The memory 204 may comprise a non-volatile memory, such as read-only memory ("ROM") and/or FLASH memory. The memory 204 may further comprise a volatile random-access memory ("RAM"), such as dynamic random access memory ("DRAM") or synchronous dynamic random dom access memory ("SDRAM"). In some embodiments, the memory 204 may store a firmware that comprises commands and data structures necessary for performing the operations of the node 108. According to further embodiments, the memory 204 may store processor-executable instructions that, when executed by the processor 202, perform some or all of the steps of the routine 400 described herein for predicting the severity of buildup within a pipe using evaluation of acoustic attenuation, as described in regard to FIG. 4.

According to embodiments, the processor 202 of some nodes, such as nodes 108A and 108B shown in FIG. 1, may be operatively connected to acoustic sensors 106 through a sensor interface 206. The sensor interface 206 allows the processor 202 to receive the signals from the sensors representative of the sensed acoustical wave in the pipe 102. For example, the sensor interface 206 may utilize an analog-to-digital converter ("ADC") to convert an analog voltage output of the acoustic sensors 106 to a digital value that is sampled by the processor 202 at a specific sampling rate sufficient to represent the acoustical wave.

In further embodiments, the processor 202 of some nodes, such as node 108C shown in FIG. 1, may be connected to the acoustical wave generator 104 through an actuator interface 208. The actuator interface 208 may allow the processor 202 to control the acoustical wave generator 104 and/or other components in the fluid distribution network. For example, the actuator interface 208 may contain a digital-to-analog converter ("DAC") that allows the processor 202 to generate an acoustical wave at the acoustical wave generator 104 at a specific frequency optimized for analysis of the buildup in the pipe 102, as is described in more detail herein.

Each node 108 may further contain a communications module 210. The communications module 210 may provide a wired or wireless connection for the node 108 to the pipe assessment system 120 through one or more networks 212, such as a wireless local area network ("WLAN"), Bluetooth, Wi-Fi, metropolitan area network ("MAN"), wide area network ("WAN"), cellular data network, and/or the Internet. The processor 202 may utilize the communications module 210 to transmit the signals from the acoustic sensors 106 over the network(s) 212 to the pipe assessment system 120 for analysis. In addition, the pipe assessment system 120 may transmit commands to the node 108 over the network(s) 212 to control actuators attached to the node. For example, the pipe assessment system 120 may send commands to the node 108C to actuate the acoustical wave generator 104 to generate an acoustical wave in the pipe 102 in order to facilitate the analysis, according to some embodiments.

The pipe assessment system 120 may represent any general purpose computer system capable of receiving the signals from the acoustic sensors 106 through the controlling nodes 108 and performing the analysis described herein for predicting the amount of buildup in a pipe of a fluid distribution system by evaluating a loss of acoustic energy from a sound source over a distance of the pipe. The pipe assessment system 120 may include one or more server computers hosting application services, web services, database services, file storage services, communication services, and the like. The pipe assessment system 120 may alternatively or additionally include virtualized, cloud-based computing resources, such as processing resources, storage resources, and the like. In some embodiments, the pipe assessment system 120 may further include an acoustic analysis module 214 for performing the acoustic analysis of the signals from the acoustic sensors 106, as described herein. The acoustic analysis module 214 may represent one or more software programs, components, and/or modules executing on the servers and/or processing resources of the pipe assessment system 120.

According to some embodiments, the pipe assessment system 120 includes or has access to computer-readable media storing program modules, data structures, and other data described herein for predicting the amount of buildup in a pipe of a fluid distribution system by evaluating a loss of acoustic energy from a sound source over a distance of the pipe. For example, the pipe assessment system 120 may have access to computer-readable media storing processor-executable instructions that, when executed by processing resources of the pipe assessment system, perform some or all of the steps of the routine 400 described herein for predicting the severity of buildup within a pipe using evaluation of acoustic attenuation, as described in regard to FIG. 4. It will be appreciated by those skilled in the art that computer-readable media can be any available media that may be accessed by the nodes 108, pipe assessment system 120, or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the nodes 108, network(s) 212, and pipe assessment system 120 may be different that that illustrated in FIG. 2 and described herein. For example, the processor 202, memory 204, sensor interface 206, actuator interface 208, and communications module 210, and/or other components and circuitry of each node 108 may be integrated within a common integrated circuit package or distributed among multiple integrated circuit packages. In some embodiments, some or all of the nodes 108 may be implemented as software applications on mobile computing platforms, such as a smartphone or laptop with cellular networking capability. Similarly, the illustrated connection pathways are provided for purposes of illustration and not of limitation, and some components and/or interconnections may be omitted for purposes of clarity. It will be further appreciated that nodes 108, networks 212, and pipe assessment system 120 may not include all of the components shown in FIG. 2, may include other components that are not explicitly shown in FIG. 2, or may utilize architectures completely different than those shown in FIG. 2.

Figure 3A:
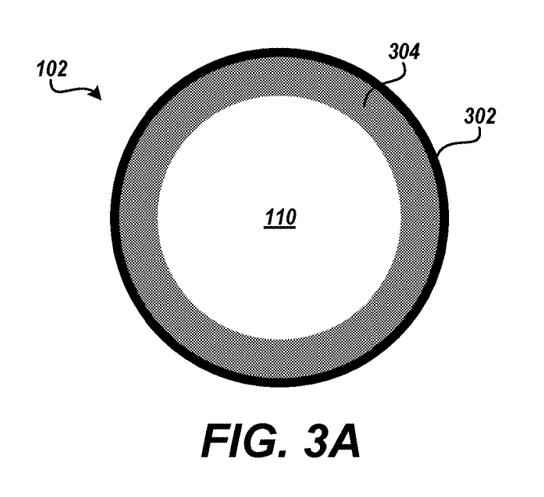
FIG. 3A is a sectional view showing a cross-section in the radial direction of a pipe of a fluid distribution with buildup inside the pipe, according to embodiments presented herein.
Figure 3B:
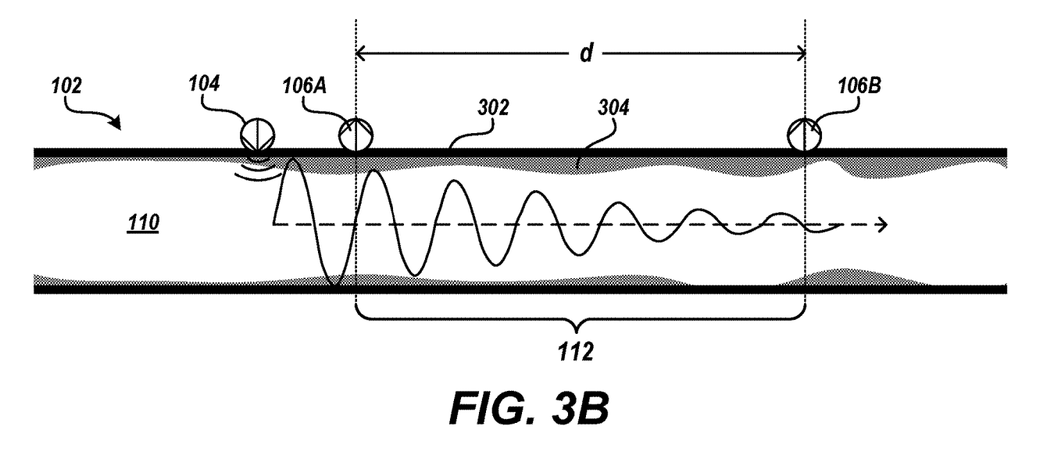
FIG. 3B is a sectional view showing a cross-section in the longitudinal direction of the pipe showing additional details of the buildup within the pipe, according to embodiments presented herein.

FIGS. 3A and 3B show additional details of the buildup, also referred to herein as "tuberculation," in a pipe 102 of a fluid distribution system, and its effects on acoustical waves traveling through the fluid contained therein. As may be seen in FIG. 3A, a tuberculation layer 304 may form on the inside of the pipe wall 302, reducing the effective area of the fluid path 110 of the pipe 102. Although the tuberculation layer 304 is shown as being uniform in FIG. 3A, it should be appreciated that the tuberculation layer may be irregular or otherwise non-uniform around the diameter of the pipe 102, as well as along the length of the pipe, as shown in FIG. 3B. This non-uniformity may be due to corrosion by-products forming over pits in the pipe wall 302, for example, or due to microbiological growth in the pipe 102. Differences in corrosion of the pipe wall 302, different flow rates through the fluid path 110, differences in temperature over time, and other factors may all contribute to non-uniformity of the tuberculation layer 304 in the pipe 102. Further, as the amount of tuberculation increases in an area, some of the tuberculation may break off or otherwise separate from the pipe wall 302, causing additional non-uniformity of the tuberculation layer 304 throughout the pipe.

As further shown by FIG. 3B, an acoustical wave generated in the fluid path 110 of a pipe 102 will lose energy/amplitude, or "attenuate," as it travels longitudinally down the pipe. At frequencies below 8000 Hz, internal (molecular) attenuation within the fluid are negligible, and the primary attenuation is caused by sound absorption of the pipe wall 302 and the tuberculation layer 304. By measuring the attenuation of the acoustical wave between two acoustic sensors 106A and 106B at known distance d apart and comparing the attenuation to models of attenuation rates of the pipe wall 302 based on known characteristics of the pipe 102, the portion of the attenuation due to the tuberculation layer 304 may be determined, and thus an amount or severity of the tuberculation can be determined for the pipe segment 112 bracketed by the acoustic sensors. This is further described below in regard to FIG. 4.

Figure 4:
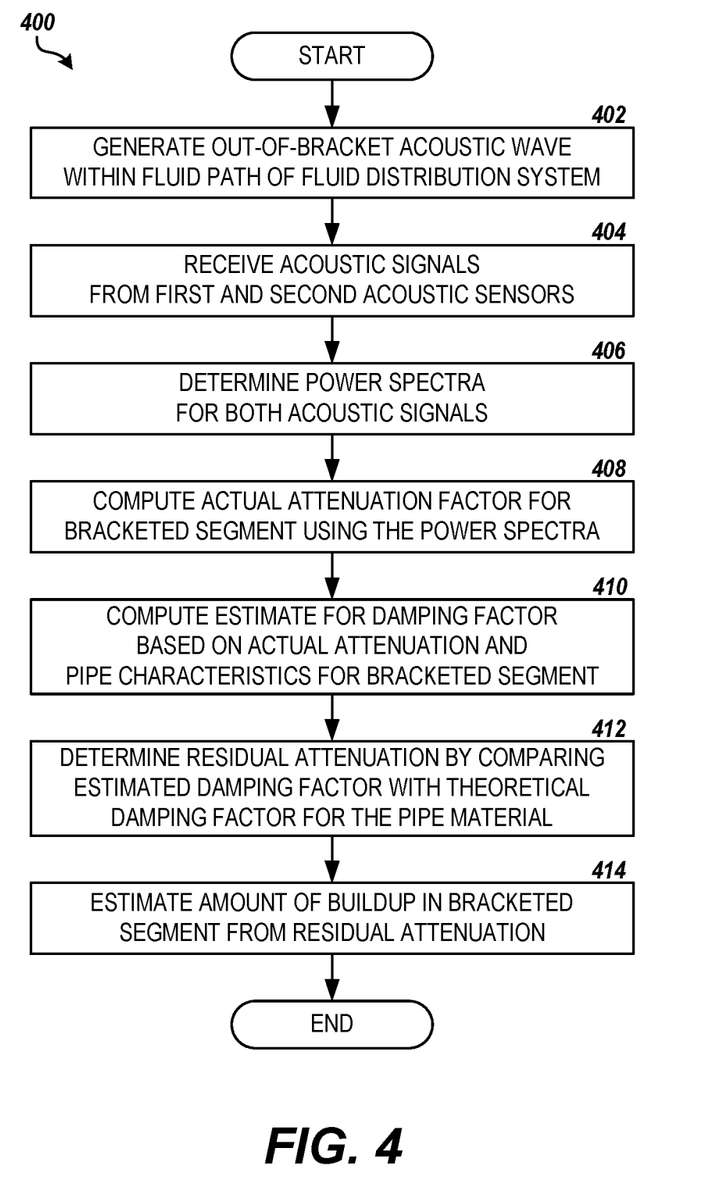
FIG. 4 is a flow diagram showing one method of predicting the severity of buildup within a pipe using evaluation of acoustic attenuation, according to some embodiments.

FIG. 4 illustrates one routine 400 for predicting the severity of buildup or tuberculation in a pipe segment 112 using evaluation of acoustic attenuation, according to some embodiments. In some embodiments, the routine 400 may be performed by the acoustic analysis module 214 of the pipe assessment system 120 in conjunction with the nodes 108 controlling the acoustical wave generator 104 and acoustic sensors 106 associated with the target pipe segment 112. In further embodiments, the routine 400 may be performed by some other combination of these and/or other components, modules, processors, and devices.

The routine 400 begins at step 402, where an acoustical wave is generated within the fluid path 110 of the target pipe segment 112. This may be performed by the node 108C attached to the acoustical wave generator 104 upon receipt of an instruction from the acoustic analysis module 214 of the pipe assessment system 120. In further embodiments, the pipe assessment system 120 or acoustic analysis module 214 may schedule a time to perform the data collection and analysis, and may send the schedule to the nodes 108 associated with the target pipe segment. The node 108C controlling the acoustical wave generator 104 may wake up at the scheduled time and produce the acoustical wave in the pipe segment 112 to facilitate the analysis. In some embodiments, the acoustical wave may be generated "out-of-bracket," i.e., in the same pipe 102 as the target segment 112 but outside of the segment bracketed by the acoustic sensors 106A and 106B.

According to embodiments, generation of the acoustical wave may comprise excitation of the pipe and/or fluid in one more frequencies, typically in a frequency range between 10 to 1000 Hz. Excitation of the pipe/fluid by the acoustical wave generator 104 may be accomplished by the use of a pulsating source, such as by mechanically tapping the pipe wall or a fluid distribution system component in fluid connection with the pipe. In further embodiments, the excitation of the pipe/fluid may be produced by a speaker or other acoustic device attached to the pipe wall 302 or inserted into the fluid path 110, by production of a fluid flow by opening and closing a valve, or the like. In some embodiments, excitation is performed in multiple frequencies, with the multiple frequencies being produced all at once or each individually in a sequence. For example, excitation may comprise producing a series or sequence of tones in different frequencies, a chirp signal (frequency sweep), a series of narrow band signals exciting different frequency bands in sequence, or the like.

In further embodiments, the frequencies for excitation may depend on characteristics of the target pipe segment 112. For example, certain frequencies of acoustical waves may attenuate faster in the pipe segment 112 than others, depending on factors such as the distance d between the acoustic sensors 106A and 106B, the diameter of the pipe, the characteristics of the fluid in the pipe, properties of the material of the pipe wall 302, composition of the soil surrounding the pipe 102, and the like. These factors may cause the pipe to act as band-pass filter favoring a particular frequency range. According to some embodiments, a frequency range for the one or more excitation frequencies may be calculated from these and other characteristics using a model as described in U.S. patent application Ser. No. 15/493,899 entitled "SOUND PROPAGATION COMPARISON WITH AUTOMATED FREQUENCY SELECTION FOR PIPE CONDITION ASSESSMENT", filed Apr. 21, 2017, issued as U.S. Pat. No. 10,209,225, the disclosure of which is incorporated herein in its entirety by this reference. In further embodiments the frequency or frequencies of excitation may be obtained by the acoustic analysis module 214 from a table indexed by one or more of the factors described above.

Next, the routine 400 proceeds from step 402 to step 404, where acoustic analysis module 214 receives signal data from the nodes 108A and 108B connected to the first and second acoustic sensors 106A and 106B representing the measurement of the acoustical wave in the pipe 102 at either end of the target segment 112. In some embodiments the nodes 108A and 108B may receive the schedule for data collection and analysis from the pipe assessment system 120 or acoustic analysis module 214, and may wake up at the scheduled time to receive the signals from the respective acoustic sensors 106A and 106B. The nodes 108A and 108B may sample the signals from the sensors through the ADC of the sensor interface 206 at a rate sufficient to represent the amplitude of the selected excitation frequencies of the acoustical wave produced by the acoustical wave generator 104. The signal data may then be stored in a buffer in the memory 204 for later transmission to the pipe assessment system 120 or acoustic analysis module 214 over the network(s) 212 or by local connection.

In other embodiments, the acoustic analysis module 214 may issue commands to the nodes 108A and 108B to initiate collection from the respective acoustic sensors 106A and 106B and stream the signal data directly to the module over the network(s) 212 in real-time. In further embodiments, the nodes 108A and 108B may perform pre-processing of the signal data, such as filtering or amplification, before the signals are sent to the pipe assessment system 120. According to some embodiments, the signal data may arrive from the nodes 108A and 108B at different times at the pipe assessment system 120, and be stored in a memory until all signal data is available for analysis by the acoustic analysis module 214.

Once the signal data from the two acoustic sensors 106A and 106B has been received, the routine 400 proceeds from step 404 to step 406, where the acoustic analysis module 214 determines the power spectrum (i.e., the power spectral density) for both acoustic signals. The power spectral density describes how power of a signal or time series of samples is distributed over frequency. According to some embodiments, the power spectrum of the acoustic signals may be estimated using Bartlett's method (also known as the method of averaged periodograms), Welch's method, or other known methods in the art for power spectral density estimation.

For example, to compute the power spectral density for each of the two signals, the signal may be split into a series of frames. The frames may be distinct (e.g., the Bartelett's method) or they may overlap (e.g., the Welch's method). All of the frames will have the same length or duration. Each frame may then be multiplied by a window function to reduce the spectral leakage effect. Several types of windows may be used, such Hamming window, Hann window, Kaiser-Bessel window, or the like. For each windowed frame, a discrete Fourier transform ("DFT") is performed to decompose the frame as a sum of sinusoidal signals with specific amplitude and phase. The periodogram (i.e., the power spectral density) for each frame is then calculated using the square of the amplitude of each frequency component to represent the power spectral density of that specific frequency component (phase is ignored). The periodograms for each frame are averaged together to produce the power spectrum for the signal.

From step 406, the routine 400 proceeds to step 408, where the acoustic analysis module 214 computes an actual attenuation factor for the target segment 112 using the power spectra of the signals from the first and second acoustic sensors 106A and 106B. This may be performed by calculating an actual attenuation factor from the difference in signal amplitude between the two power spectra for each frequency component based on a theoretical model (exponential) describing the reduction of acoustic power over the distance d. For example, the following theoretical model:

$$\text{Attenuation} = e^{-\beta df}$$

may be utilized to derive the following formula for each frequency component:

$$\beta + \varepsilon_k = -\frac{\ln(SpB_k/SpA_k)}{df_k}$$

where β is the actual attenuation factor, $\varepsilon_k$ is the error value for frequency component k, $SpA_k$ and $SpB_k$ are the spectral power for frequency component k from the periodograms for the signals from acoustic sensor 106A (closest to the acoustical wave source) and acoustic sensor 106B (farthest from the acoustical wave source), respectively, d is the distance between the acoustic sensors, and $f_k$ is the frequency. A least-squares mean regression may then be utilized to find a β value for the target segment 112 for which the sum of all errors squared is minimum.

In other embodiments, a separate attenuation factor $\beta_k$ may be calculated for each frequency component using the same or similar exponential model:

$$\beta_k = -\frac{\ln(SpB_k/SpA_k)}{df_k}$$

and then the $\beta_k$ value for each frequency component may be averaged together to produce the actual attenuation factor β for the target segment 112. In a further embodiment, the actual attenuation factor value may be calculated by multiplying the power spectrum measured at the closest acoustic sensor 106A with a similar exponential function to compute a power spectrum estimate for the distant acoustic sensor 106B. The exponential decay may be described by an attenuation parameter. The measured power spectrum for the distant sensor is compared with the estimate, and the attenuation parameter is varied to find the value of 0 that offers the best match (e.g., minimum sum of errors squared) between the estimated power spectrum and the measured spectrum at the distant acoustic sensor 106B.

The routine 400 proceeds from step 408 to step 410, where the acoustic analysis module 214 determines an estimate for the damping factor the bracketed segment 112 based on the actual attenuation factor β and the characteristics of the pipe 102. For example, the following theoretical model may be used to calculate the estimate for the damping factor:

$$\beta = \frac{1}{v_0} \frac{\eta DK/2Et}{\sqrt{\left(1 + \frac{DK}{Et}\right)}} \rightarrow \eta_{est.} = \frac{\beta v_0 \sqrt{\left(1 + \frac{DK}{Et}\right)}}{DK/2Et}$$

where $\eta_{est.}$ is the estimated damping factor of the pipe wall 302, D is the diameter of the pipe 102, K is the bulk modulus of water (or other fluid flowing through the system), E is the elastic modulus of the pipe material, t is the wall thickness, and $v_0$ is the free-field water (or other fluid) wavespeed. According to some aspects, the free-field water (or other fluid) wavespeed $v_0$ may comprise the propagation velocity of acoustical waves in an unbounded fluid body.

In some embodiments, the pipe characteristics for the theoretical model may be obtained by the acoustic analysis module 214 from a memory, such as a database, of the pipe assessment system 120 for the specific pipe 102 or pipe segment 112 being tested. In other embodiments, the pipe characteristics may be supplied by an operator of the pipe assessment system 120 through a user interface.

Next, at step 412, the acoustic analysis module 214 determines a "residual attenuation" based on the difference between the estimate for the damping factor $\eta_{est.}$ calculated in step 410 and a theoretical damping factor η for the pipe material. The theoretical damping factor η for various pipe materials may be stored in a table stored in the pipe assessment system 120. The acoustic analysis module 214 may retrieve the value for η from this table based on the pipe material retrieved for the target segment 112 along with the other pipe characteristics in step 410. In other embodiments, the theoretical damping factor η for the material of the target segment 112 may be specified by the operator of the pipe assessment system 120 through the user interface.

From step 412, the routine 400 proceeds to step 414, where the acoustic analysis module 214 estimates the amount of tuberculation (buildup) in the pipe segment 112 based on the residual attenuation determined in step 412. The presence of a residual attenuation means that the attenuation within the pipe segment bracketed by the sensors cannot be explained solely by the attenuation due to the pipe characteristics. Hence, the presence of a residual attenuation is a direct method of identifying the presence of buildup in the segment. As discussed above, the amount of tuberculation in the pipe segment 112 may be a good indicator of the amount of tuberculation in the pipe 102 or series of similar pipes (e.g., same material and diameter) in the fluid distribution. Using the difference in the damping factor to predict the presence of buildup instead of a difference in the attenuation factor isolates more precise changes in the pipe structure and is not influenced by other parameters.

According to experimental results, the residual attenuation may vary from 0 (no buildup) to typically 0.1 (severe buildup). In some embodiments, in order to estimate an amount of buildup in the pipe segment 112, the acoustic analysis module 214 may utilize a series of ranges of the residual attenuation to predict various levels of buildup. For example, a residual attenuation value from 0 to 0.03 may indicate no significant buildup within the pipe 102 or small localized buildup that does not influence the attenuation. A residual attenuation value from 0.03 to 0.05 may indicate a limited presence of buildup within the pipe 102 or severe buildup localized only to specific portions of the pipe. A residual attenuation higher than 0.05 may indicate the presence of severe buildup within the pipe 102 with a likelihood of heavy accumulation for all or some portions of the pipe. It will be appreciated that the number of ranges and range thresholds utilized may vary based on the pipe material, the diameter of the pipe 102, the thickness of the pipe wall 302, and other pipe characteristics, and may be determined by experimentation and verified by physical examination of the pipes of the particular fluid distribution system. From step 414, the routine 400 ends.

Based on the foregoing, it will be appreciated that technologies for predicting the amount of buildup in a pipe of a fluid distribution system by evaluating a loss of acoustic energy from a sound source over a distance of the pipe are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A method comprising the steps of:
measuring an acoustic energy in an acoustical wave travelling in a fluid in a pipe at first location and a second location along the pipe;
computing an estimated damping factor for a segment of the pipe between the first location and the second location based on a comparison of the acoustic energy measured at the first location and the second location along the pipe;
determining residual attenuation for the segment of the pipe from a difference between the estimated damping factor and a theoretical damping factor for the pipe based on a material comprising a pipe wall; and
estimating an amount of buildup in the pipe based on the residual attenuation.

2. The method of claim 1, wherein the acoustic energy in the acoustical wave is measured by a first acoustic sensor in acoustical communication with the pipe at the first location and a second acoustic sensor in acoustical communication with the pipe at the second location.

3. The method of claim 2, further comprising receiving a first signal from the first acoustic sensor and a second signal from the second acoustic sensor representing the sensed acoustical wave at the respective locations along the pipe.

4. The method of claim 3, further comprising:
determining a power spectrum for each of the first signal and the second signal; and
computing an actual attenuation of the acoustical wave between the first location and the second location by comparing the power spectrum of the first signal to the power spectrum of the second signal, wherein the estimated damping factor for the segment of the pipe is calculated from the actual attenuation based on a theoretical attenuation model for the pipe.

5. The method of claim 4, wherein the theoretical attenuation model for the pipe comprises:

$$\beta = \frac{1}{v_0} \frac{\eta DK/2Et}{\sqrt{\left(1 + \frac{DK}{Et}\right)}}$$

wherein $\eta$ is the estimated damping factor, D is a diameter of the pipe, K is a bulk modulus of the fluid, E is an elastic modulus of the material comprising the pipe wall, t is a thickness of the pipe wall, and $v_0$ is a propagation velocity of acoustical waves in the fluid.

6. The method of claim 4, wherein the power spectra of the first and second signals are determined using one of Bartlett's method and Welch's method.

7. The method of claim 4, wherein the actual attenuation of the acoustical wave is computed using an exponential model based on each frequency component of the power spectra and a distance between the first location and the second location along the pipe.

8. The method of claim 2, wherein at least one of the first acoustic sensor and the second acoustic sensor comprises a transducer attached to the pipe wall at the respective location.

9. The method of claim 1, further comprising the step of generating the acoustical wave in the fluid by an acoustical wave generator in acoustical communication with the pipe at a location outside of the segment of the pipe between the first location and the second location.

10. The method of claim 9, wherein the acoustical wave generator comprises a reverse hydrophone inserted into the fluid within the pipe.

11. A non-transitory computer-readable medium containing processor-executable instructions that, when executed by a computing system, causes the computing system to:
receive a first signal from a first acoustic sensor representing a sound pressure of an acoustical wave travelling in a fluid in a pipe sensed at a first location along the pipe and a second signal from a second acoustic sensor representing the sound pressure of the acoustical wave sensed at a second location along the pipe;

compute an estimated damping factor for a segment of the pipe between the first location and the second location based on a comparison of the sound pressures sensed at the first location and the second location along the pipe from the first and second signals;

determine a residual attenuation for the segment of the pipe from a difference between the estimated damping factor and a theoretical damping factor for the pipe based on a material comprising a pipe wall; and estimate an amount of buildup in the pipe based on the residual attenuation.

12. The non-transitory computer-readable medium of claim 11, wherein estimating the amount of buildup in the pipe comprises determining that the residual attenuation falls within one of a plurality of ranges, each of the plurality of ranges associated with a severity level of buildup in the pipe.

13. The non-transitory computer-readable medium of claim 11, comprising further processor-executable instructions that cause the computing system to:

determine a power spectrum for each of the first signal and the second signal; and compute an actual attenuation of the acoustical wave between the first location and the second location by comparing the power spectrum of the first signal to the power spectrum of the second signal, wherein the estimated damping factor for the segment of the pipe is calculated from the actual attenuation based on a theoretical attenuation model for the pipe.

14. The non-transitory computer-readable medium of claim 13, wherein the theoretical attenuation model for the pipe comprises:

$$\beta = \frac{1}{v_0} \frac{\eta DK/2Et}{\sqrt{\left(1 + \frac{DK}{Et}\right)}}$$

wherein $\eta$ is the estimated damping factor, D is a diameter of the pipe, K is a bulk modulus of the fluid, E is an elastic modulus of the material comprising the pipe wall, t is a thickness of the pipe wall, and $v_0$ is a propagation velocity of acoustical waves in the fluid.

15. The non-transitory computer-readable medium of claim 13, wherein the power spectra of the first and second signals are determined using one of Bartlett's method and Welch's method.

16. A water distribution system comprising:

an acoustical wave generator in acoustical communication with a pipe in the water distribution system, the acoustical wave generator configured to generate an acoustical wave in a fluid path of the pipe;

a first acoustic sensor in acoustical communication with the pipe at a first location and configured to measure a sound pressure of the acoustical wave at the first location and produce a first signal representing the sensed sound pressure at the first location;

a second acoustic sensor in acoustical communication with the pipe at a second location and configured to measure the sound pressure of the acoustical wave at the second location and produce a second signal representing the sensed sound pressure at the second location; and an acoustic analysis module executing on a pipe assessment system, the acoustic analysis module configured to receive the first signal and the second signal, compute an estimated damping factor for a segment of the pipe between the first location and the second location based on a comparison of the sound pressures measured at the first location and the second location from the first and second signals, determine a residual attenuation for the segment of the pipe from a difference between the estimated damping factor and a theoretical damping factor for the pipe based on a material comprising a pipe wall, and estimate an amount of buildup in the pipe based on the residual attenuation.

17. The water distribution system of claim 16, wherein the acoustic analysis module is further configured to:

determine a power spectrum for each of the first signal and the second signal; and compute an actual attenuation of the acoustical wave between the first location and the second location by comparing the power spectrum of the first signal to the power spectrum of the second signal, wherein the estimated damping factor for the segment of the pipe is calculated from the actual attenuation based on a theoretical attenuation model for the pipe.

18. The water distribution system of claim 17, wherein the theoretical attenuation model for the pipe comprises:

$$\beta = \frac{1}{v_0} \frac{\eta DK/2Et}{\sqrt{\left(1 + \frac{DK}{Et}\right)}}$$

wherein $\eta$ is the estimated damping factor, D is a diameter of the pipe, K is a bulk modulus of water, E is an elastic modulus of the material comprising the pipe wall, t is a thickness of the pipe wall, and $v_0$ is a propagation velocity of acoustical waves in water.

19. The water distribution system of claim 16, wherein the acoustic analysis module is further configured to, prior to receiving the first and second signals, cause the acoustical wave generator to generate the acoustical wave in the fluid path of the pipe and the first and second acoustic sensors to measure the acoustic energy of the acoustical wave at the respective locations.

20. The water distribution system of claim 16, wherein at least one of the first acoustic sensor and the second acoustic sensor comprises a transducer attached to the pipe wall at the respective location.

* * * * *